United States Patent
Sugata et al.

(10) Patent No.: US 6,519,823 B1
(45) Date of Patent: Feb. 18, 2003

(54) MACHINE TOOL

(75) Inventors: Shinsuke Sugata, Fukuyama (JP); Yoshihide Seo, Hiroshima-ken (JP)

(73) Assignee: Horkos Corp., Hiroshima-ken (JP)

( * ) Notice: Subject to any disclaimer, the term of this patent is extended or adjusted under 35 U.S.C. 154(b) by 0 days.

(21) Appl. No.: 10/018,256

(22) PCT Filed: Jun. 28, 2000

(86) PCT No.: PCT/JP00/04284

§ 371 (c)(1), (2), (4) Date: Dec. 18, 2001

(87) PCT Pub. No.: WO01/02132

PCT Pub. Date: Jan. 11, 2001

(30) Foreign Application Priority Data

Jul. 1, 1999 (JP) .......................... 11-187585

(51) Int. Cl.⁷ .............................. B23Q 5/36; B23C 1/02; B23B 39/02
(52) U.S. Cl. ................. 29/26 A; 408/234; 409/202; 409/212; 409/235; 483/16
(58) Field of Search ................. 29/26 A, 27 C, 29/39; 483/30, 16; 409/202, 212, 235, 236, 201; 408/234; 318/575; 451/340; 219/68

(56) References Cited

U.S. PATENT DOCUMENTS

| | | | | | |
|---|---|---|---|---|---|
| 3,684,395 A | * | 8/1972 | Nurakami | ................ | 408/235 |
| RE31,288 E | * | 6/1983 | Matsuzaki et al. | ........... | 29/27 C |
| 4,679,295 A | * | 7/1987 | Lopez | ................ | 29/564.8 |
| 5,084,951 A | * | 2/1992 | Bonomi et al. | ............. | 29/26 A |
| 5,346,345 A | * | 9/1994 | Jerzycke et al. | ............ | 409/235 |
| 5,379,509 A | * | 1/1995 | Mills et al. | ................ | 29/26 A |
| 5,662,568 A | * | 9/1997 | Lindem | ................ | 483/30 |
| 5,758,429 A | * | 6/1998 | Farzan et al. | ................ | 409/202 |
| 5,846,172 A | * | 12/1998 | Ira | ................ | 483/31 |
| 5,988,959 A | * | 11/1999 | Sugata | ................ | 409/141 |
| 6,161,995 A | * | 12/2000 | Wakazono et al. | .......... | 409/191 |
| 6,246,024 B1 | * | 6/2001 | Hosaka | ................ | 219/69.12 |
| 6,447,224 B2 | * | 9/2002 | Mitsuzono et al. | ......... | 409/201 |

FOREIGN PATENT DOCUMENTS

| | | | | | |
|---|---|---|---|---|---|
| JP | 57-54042 | * | 3/1982 | ................ | 409/235 |
| JP | 4-365529 | | 12/1992 | | |
| JP | 10-122297 | | 5/1998 | | |
| JP | 11-99424 | | 4/1999 | | |
| JP | 11-216633 | * | 8/1999 | ................ | 29/26 A |

* cited by examiner

Primary Examiner—William Briggs
(74) Attorney, Agent, or Firm—Venable; John P. Shannon; Chad C. Anderson

(57) ABSTRACT

A machine tool capable of reducing the vibration of a spindle head to enable a high-precision machining, wherein a column (2) is mounted fixedly onto a bed (1), a first saddle (4) forming a square frame body of rectangular cross-section is mounted on the column (2) movably in vertical direction (f1), a second saddle (6) forming a square frame body (6a) smaller in size than the above square frame body is mounted inside the first saddle (4) movably in lateral direction (f2), a horizontal guide frame (6b) of a specified length is mounted on the rear surface of the square frame body (6a) of the second saddle (6) in the state of being crossed at right angle to the rear surface, rail members (5, 7) are laid down on square frame body upper and lower prismatic bodies (4b, 4c) of the first saddle (4) and the horizontal guide frame (6b) of the second saddle (6), and concrete is filled sealingly into the square frame body of the first saddle (4) and/or the square frame body of the second saddle (6) and the horizontal guide frame (6b) so as to form a vibration damping structural body.

1 Claim, 5 Drawing Sheets

MACHINE TOOL

FIELD OF THE INVENTION

The present invention relates to a machine tool that enables to accelerate a feed speed for three-dimensional direction of a spindle and to improve machining precision with the first and the second saddles.

BACKGROUND OF THE INVENTION

A conventional machine tool has been already disclosed in a prior art reference, for example, the Japanese Patent Provisional Publication No. 365529 of 1992. As shown therein, the machine tool is defined by the column mounted fixedly onto a bed in the spindle direction, the first saddle guided on the column movably in vertical direction, the second saddle guided on the first saddle movably in lateral direction, and the spindle guided on the second saddle movably in the longitudinal direction.

The above first or second saddle is generally made of casting, and therefore the spindle head supported on these saddles sometimes vibrates to such an extent that affects machining precision in machining.

An object of this invention is to provide a machine tool that reasonably prevents vibrations of the spindle head and the like and enables a high-speed and a high-precision machining.

SUMMARY OF THE INVENTION

To achieve the above object, the invention is characterized by a machine tool having the following structure. That is, the machine tool comprises a bed, a column, a first saddle and a second saddle. The column forming a rectangular frame body making the central inside into a large space is mounted standingly onto one end of the bed so that the space is disposed on the front side. A pair of guide rails are mounted on the front surface of the column in vertical direction. On the other hand, the first saddle forming a square frame body whose upper and lower side members are made of prismatic members of rectangular cross-section, is movable to the vertical direction through the guide rails. A servomotor to drive laterally the following second saddle and a lateral screw axis combined with the servomotor are provided on the upper surface of the upper side member of the first saddle.

Besides, the second saddle is formed into a square frame body smaller in size than the first saddle and provided with a bulging member on the upper of the square frame body. The bulging member is screwed with the lateral screw axis so as to displace the second saddle in lateral direction. A pair of right and left square cylindrical members of rectangular cross-section are mounted on a lower rear surface of the square frame body in a specified length horizontal direction to cross at right angle to the rear surface. Besides, rail members are laid on the upper and lower prismatic bodies of the first saddle and the square cylindrical members of the second saddle. The invention is characterized by filling sealingly concrete into the prismatic bodies and a pair of right and left square cylindrical members provided with the guide rails.

BRIEF DESCRIPTION OF THE DRAWINGS

FIG. 5 shows a part of the above characteristic region,

PREFERRED EMBODIMENT OF THE PRESENT INVENTION

Figure 1:
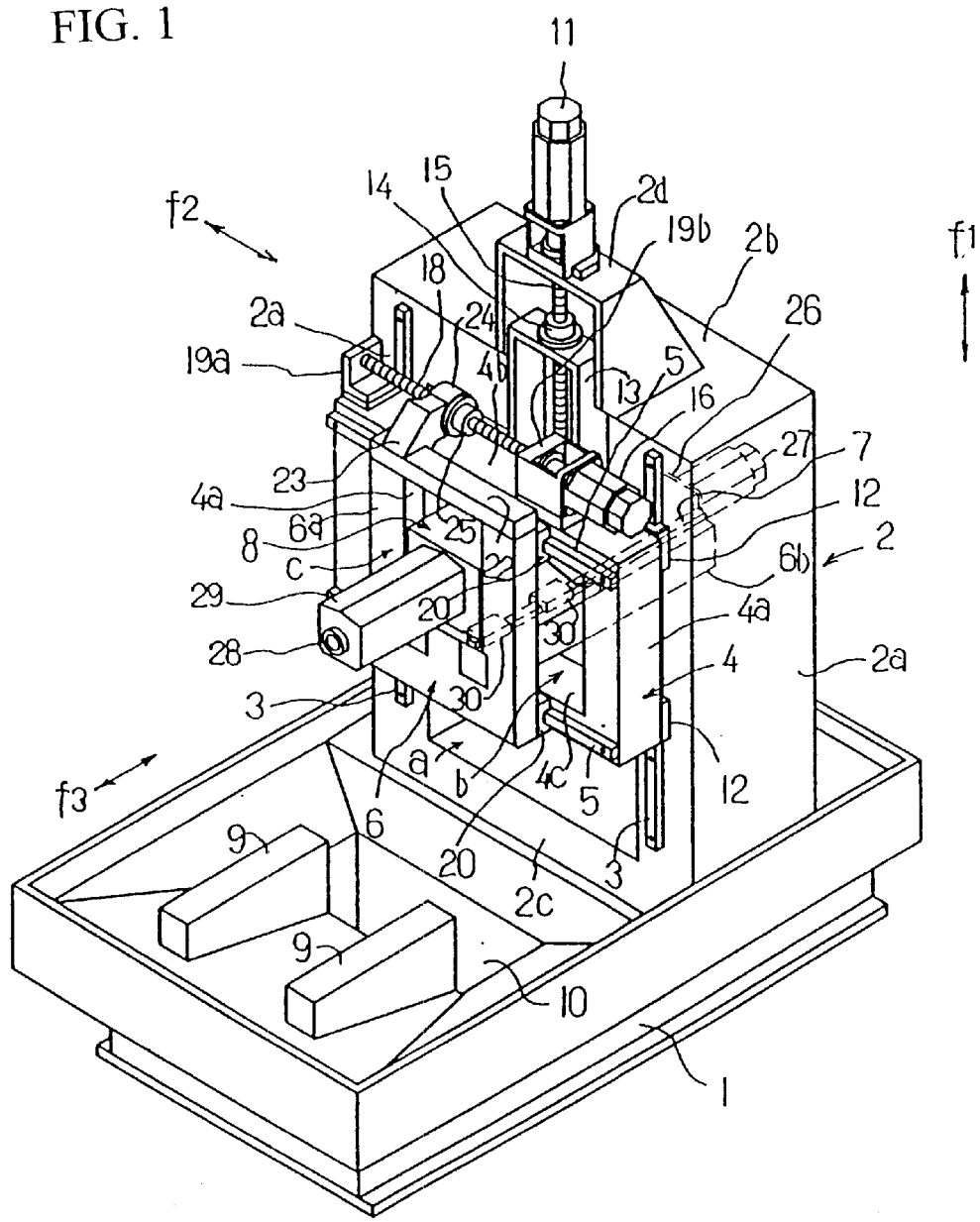
FIG. 1 is a perspective view showing a characteristic region of a machine tool in the present invention.
Figure 2:
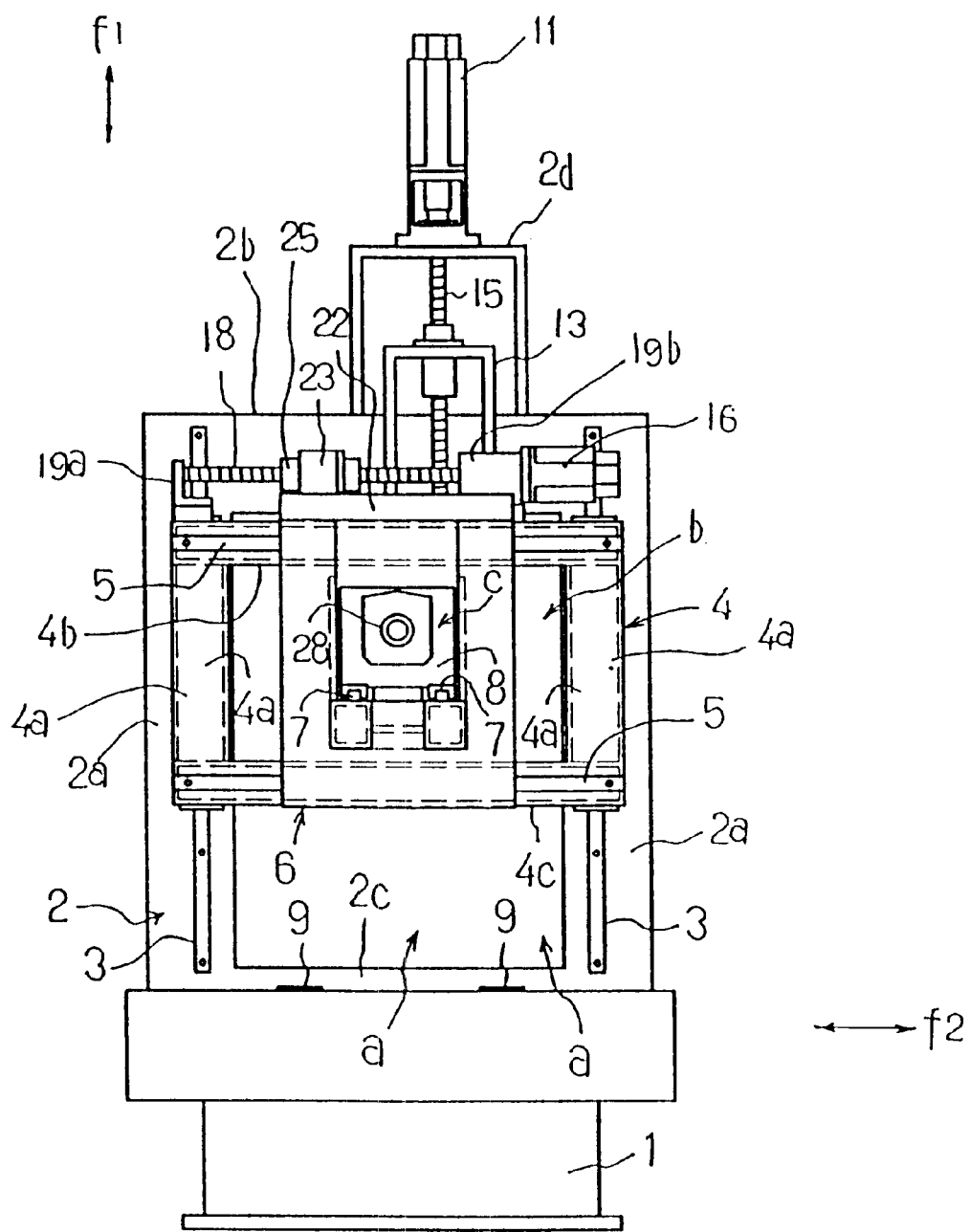
FIG. 2 is a front view of the above characteristic region.
Figure 3:
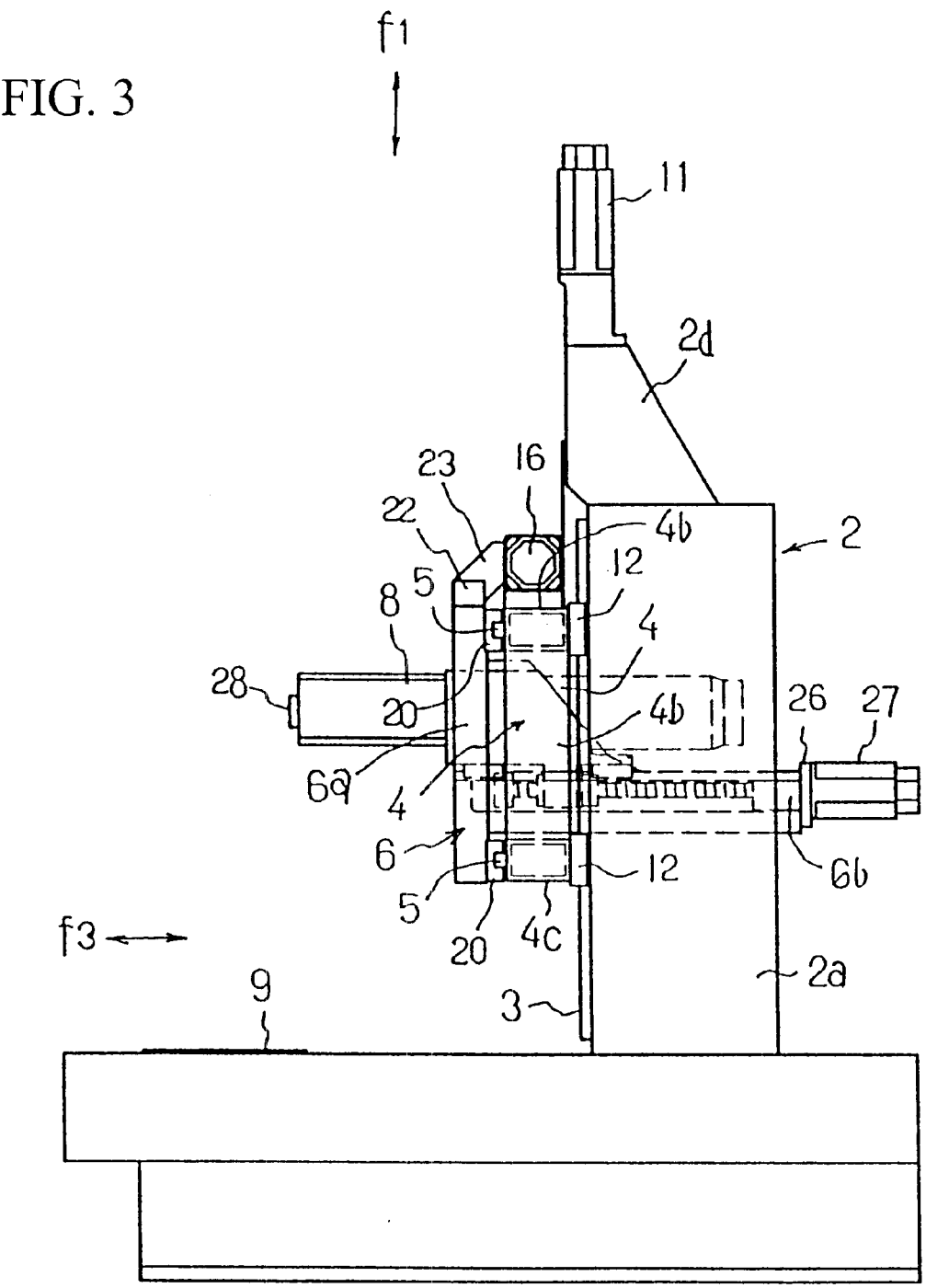
FIG. 3 is a side view of the above characteristic region.
Figure 4:
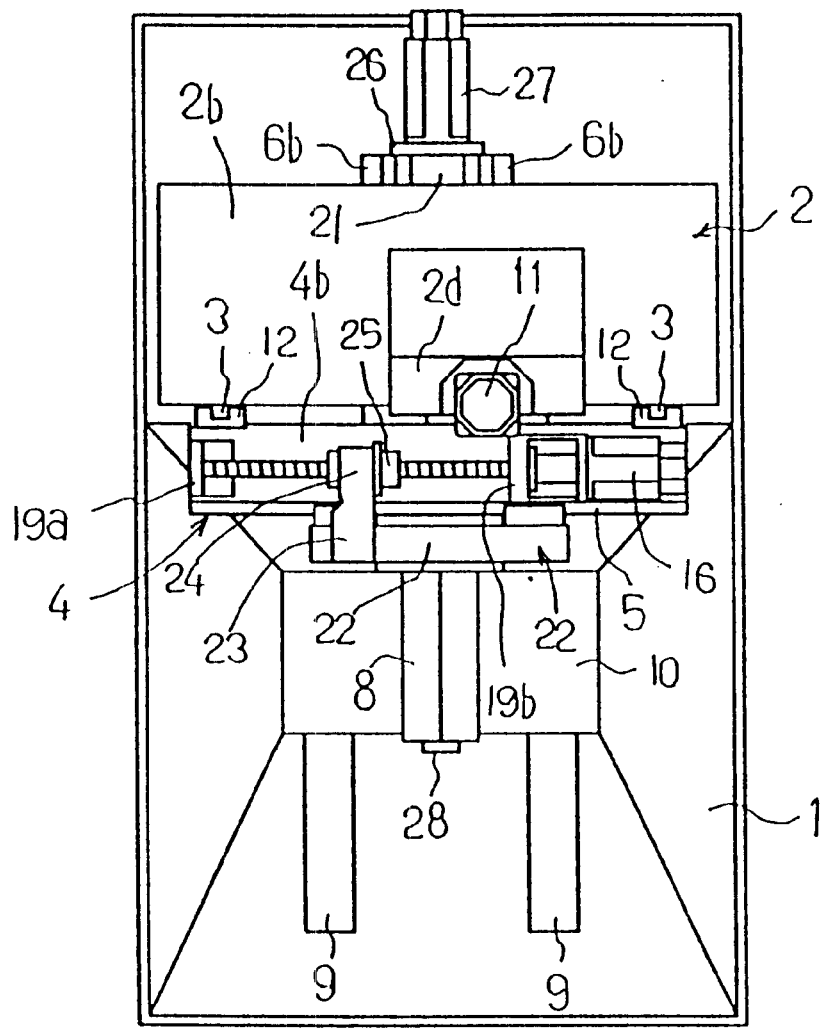
FIG. 4 is a plane view of the above characteristic region.

The present invention is explained with reference to drawings to describe in detail.

A machine tool comprises a bed 1 forming a lowermost part, a column 2 fixed standingly on the upper surface of the bed 1, the first saddle 4 guided free-slidably in vertical direction f1 through a pair of guide rails 3 and 3 for upper and lower sides mounted fixedly onto the front surface of the column 2, the second saddle 6 guided free-slidably in lateral direction f2 through a pair of rail members 5 and 5 for right and left sides mounted fixedly onto the front surface of the first saddle 4, and a spindle head 8 guided free-slidably in longitudinal direction f3 through a pair of rail members 7 and 7 for front and back sides mounted fixedly on the second saddle 6.

An explanation follows about the above specific components.

That is, the bed 1 is formed into a box structure out of steel plates, and supporting members 9 and 9 are fixed on the upper surface of the bed 1 in front of the column 2 to fix a not-illustrated work-table. A drop hole. 10 is provided at the center of the bed 1 to drop cutting chips and coolant into a specified position.

The column 2 has a pair of right and left vertical parts 2a and 2a as well as a pair of upper and lower lateral parts 2b and 2c, and is mainly composed of a square frame body forming a comparative large square hole "a" for front back sides to the center. A motor table 2d is provided to the upper lateral part 2b, and a servomotor 11 is fixed thereon to drive vertically the first saddle 4.

Figure 5A:
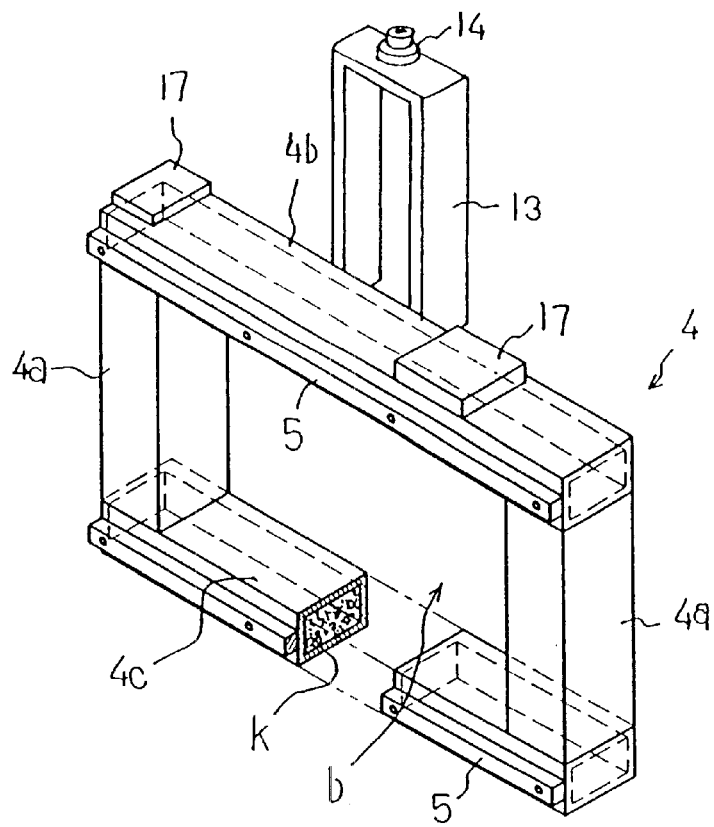
FIG. 5A is a perspective view of the first saddle.

The first saddle 4, as shown in FIG. 5A, has a pair of right and left vertical single prismatic bodies 4a and 4a of rectangular cross-section as well as a pair of upper and lower lateral single prismatic bodies 4b and 4c of rectangular cross-section, and forms a comparative large square hole "b" for front and back sides to the center. In addition, the first saddle 4 is provided with a vertical square frame body made of steel plates enough to accept in the front surface of the column 2. Interfitting members 12, which are guided by the rail members 3 and 3, are fixed on the rear surface of the square frame. A pair of rail members 5 and 5 are fixed on the front surfaces of the lateral prismatic bodies 4b and 4c so as to guide the second saddle 6. Moreover, a bracket 13 is fixed on the rear surface of the upper lateral prismatic body 4b in an inverse U letter shape at front sight, and a nut body 14 is fixed on the top of the bracket 13.

The lateral prismatic bodies 4b and 4c are respectively filled with concrete "k" so as to be sealed in airtight. Here, the concrete "k" is used in a broad sense such as cement concrete, cement mortar, cement paste, plastics concrete and asphalt concrete. The concrete "k" may be filled over the full length of the prismatic bodies 4b and 4c.

The concrete "k" filled into the prismatic bodies 4b and 4c effectively increases and stabilizes rigidity and mass concerned in the rail members of the square frame body mainly composed of the first saddle 4. The concrete "k" is confined in airtight, thereby preventing water evaporating. Therefore, the concrete "k" is prevented an aged deterioration due to touching with the air.

A vertical screw axis 15, which combines with an output axis of the servomotor 11, is screwed into the nut body 14. A servomotor 16 is provided on the upper surface of the upper lateral prismatic body 4b to drive the second saddle 6 in lateral direction. Besides, as shown in FIG. 5A, bearing members 19a and 19b, which support rotatively a lateral screw axis 18 that is combined with an output axis of the servomotor 16, are fixed on a pair of reinforcing plates 17 and 17 that are fixed on the prismatic body 4b.

Figure 5B:
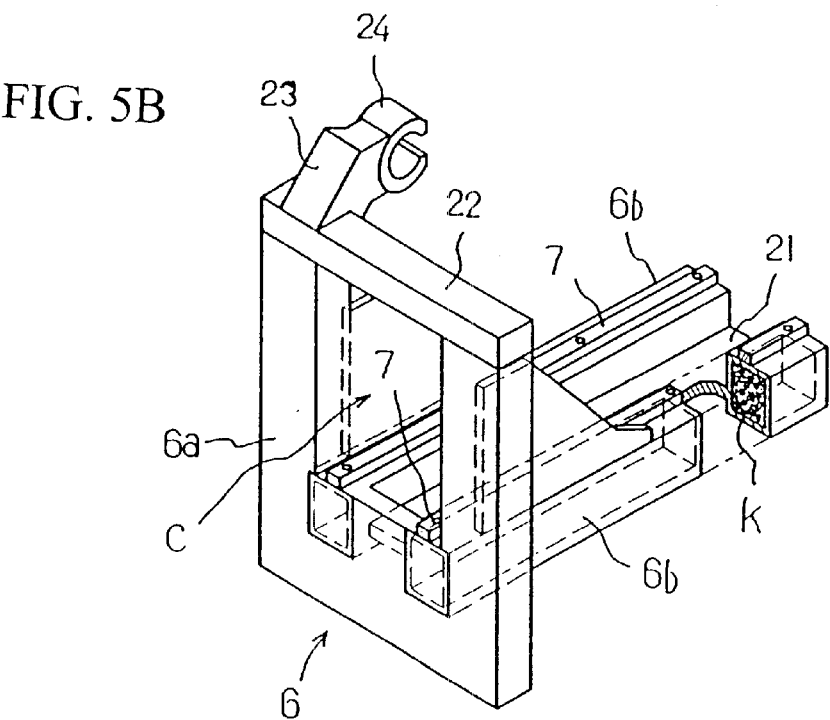
FIG. 5B is a perspective view of the second saddle.

As shown in FIG. 5B, the second saddle 6 forms a square hole "c" for front and back sides enough to contain the spindle head 8 to the center, and is a vertical square frame body 6a forming a comparative small enough to be accepted within the front surface of the first saddle 4. Here, a pair of right and left square cylindrical members 6b and 6bcomprising cylindrical members of rectangular cross-section made of steel plates are secured on the lower rear surface of the square frame body 6a in a horizontal specified length sphere, and thereon are fixed a plurality of interfitting members 20 which are guided by the rail members 5 and 5. Moreover, the rail members 7 are laid on the upper surfaces of the above-mentioned square cylindrical members 6b, thereby combining these square cylindrical members 6b and 6b through a level steel plate 21b.

The concrete "k" is filled sealingly into a pair of square cylindrical members 6b and 6b parallel-mounted within a specified length in horizontal state as well as the lateral prismatic bodies 4b and 4c of the first saddle. In this case, the concrete "k" is filled over the full length of the square cylindrical members 6b and 6b.

Therefore, rigidity and mass concerned in guide members that easily vibrate by weight of the spindle head 8 are increased effectively. Besides, the concrete "k" is contained in airtight, thereby preventing water evaporating as well as the first saddle. Therefore, the concrete "k" is prevented the aged deterioration due to touching with the air like the above.

A bulging member 23 is provided upwardly oblique back on one side of the upper surface of the upper lateral prismatic body 22 of the square frame body 6a, and an open ring nut supporting member 24 is fixed on the tip of the bulging member 23. Here, the lateral screw axis 18 is screwed into a nut body 25 that is clamped by the nut supporting member 24. On the other hand, a vertical supporting plate 26 is secured between rear ends of a pair of right and left square cylindrical members 6b and 6b, and a servomotor 27 is fixed on the rear surface of the supporting plate 26 to displace the spindle head 8 in longitudinal direction f3.

The spindle head 8 is provided with a head frame 29 that supports free-rotatively a spindle 28 for front and back sides. Besides, a not-illustrated servomotor is provided inside the head frame 29 to rotate the spindle 28, and a plurality of interfitting members 30 are provided on the lower surface of the head frame 29 so as to be guided by the rail members 7.

Besides, a not-illustrated screw-nut mechanism is provided between the head frame 29 and the servomotor 27 to displace the head frame 29 in longitudinal direction by rotations of the servomotor 27.

In order to form a machining center based on the above characteristics, the following not-illustrated components are added. That is, an automatic tool changer is provided to receive a tool magazine storing many tools or tools of the tool magazine and to insert tightly them into the tip of the spindle 28, or conversely to extract them from the tip of the spindle 28 and to put back them into the tool magazine.

Besides, an enclosure is provided at need to cover the whole components on the bed 1.

Next, an explanation follows about operations of the above machine tool. The first saddle 4 is displaced in the vertical direction f1 by rotations of the servomotor 11, the second saddle 6 in the lateral direction f2 by the servomotor 16, and the spindle head 8 in the longitudinal direction f3 by the servomotor 27, respectively. Therefore, the spindle 28 is displaced on an optional position of three-dimensional directions.

Hence, a workpiece fixed on the not-illustrated work-table can be machined by means of displacement of the spindle 28 and rotations by the tool drive motor that is attached on the tip of the spindle 28.

Since the first saddle 4 increases rigidity and mass by the concrete "k" filled sealingly into the lateral prismatic bodies 4b and 4c, it hardly vibrates during the above working, thereby reducing vibrations of the second saddle 6 and the spindle head 8 and the like to enable a high-precision machining. Besides, since the space of the column in the central inside, nuclei of the first saddle and the second saddle are square frame body, respectively, the spindle head 8 can be assembled through these spaces, thereby compacting the size of the whole machine tool, as well as stabilizing the whole supporting.

Besides, a pair of right and left square cylindrical members 6b and 6b that are mounted on the lower rear surface of the second saddle 6 in the state of being crossed at right angle thereto increase in rigidity and mass by the concrete "k" filled therein as well as the lateral prismatic bodies 4b and 4c of the first saddle 4, thereby effectively preventing vibrations. Accordingly, the spindle head 8 is directly reduced vibrations during moving or machining to improve an operating efficiency.

Since the second saddle 6 comprises the square frame body 6a and a pair of right and left square cylindrical members 6b and 6b that are mounted on the lower rear surface thereof in the state of being crossed at right angle thereto, the spindle head 8 is disposed inside the square hole "c" of the square frame body 6a, thereby assembling compactly the spindle head 8. Besides, the guided length of the spindle head 8 in the longitudinal direction f3 is enlarged, thereby increasing the stability of the spindle head 8 to a moment in the longitudinal direction f3 and the moving range of the spindle head 8 in the longitudinal direction f3 extremely.

Here, when the concrete "k" is filled into only the square cylindrical members 6b and 6b, rigidity and mass necessary for the guide members of the spindle head can be obtained easily.

The present invention has the following effects.

In a machine tool having the first saddle and the second saddle, rigidity and mass to the spindle head are kept in well balance to hardly vibrate during machining, thereby effectively enabling the high-speed and high-precision machining stablely.

What we claim is:

1. A machine tool, comprising:
   a bed (1);
   a column (2) of a rectangular frame body forming a large space on its central inside, mounted standingly onto one side of said bed (1) so as to dispose the space to a front side;
   a pair of right and left guide rails (3, 3) mounted on a front surface of said column (2) in a vertical direction;

a first saddle (4) having a frame body whose upper and lower side members (4b, 4c) are made of prismatic bodies of rectangular cross-section mounted movably in the vertical direction (f1) through said guide rails (3, 3);

a servomotor (16) and a screw having a lateral screw axis (18) provided on an upper surface of the upper side member (4b) of the first saddle (4), said servomotor (16) moving laterally a second saddle (6), and said screw (18) being driven by the servomotor;

the second saddle (6) forming a frame body (6a) smaller in size than the frame body of the first saddle (4), the frame body of said second saddle riding on rails on said first saddle;

a bulging member (23) provided on an upper surface of the frame body (6a) of said second saddle, and screwed on the screw (18) to displace the second saddle in a lateral direction (f2);

a pair of right and left members (6b, 6b) of rectangular cross-section mounted on a lower rear surface of said second saddle and extending in a horizontal direction at a right angle to the rear surface; and rail members (5, 7) laid on the upper and lower side members (4b, 4c) of the frame body of the first saddle (4) and on the members (6b, 6b) mounted on a lower rear surface of the second saddle (6);

wherein the prismatic bodies (4b, 4c) and said pair of right and left members (6b, 6b) are filled with concrete (k) sealed from air.

\* \* \* \* \*